March 22, 1932.  P. B. CLAUSEN  1,850,534
MUSKRAT TRAP
Filed Sept. 11, 1929  2 Sheets-Sheet 1
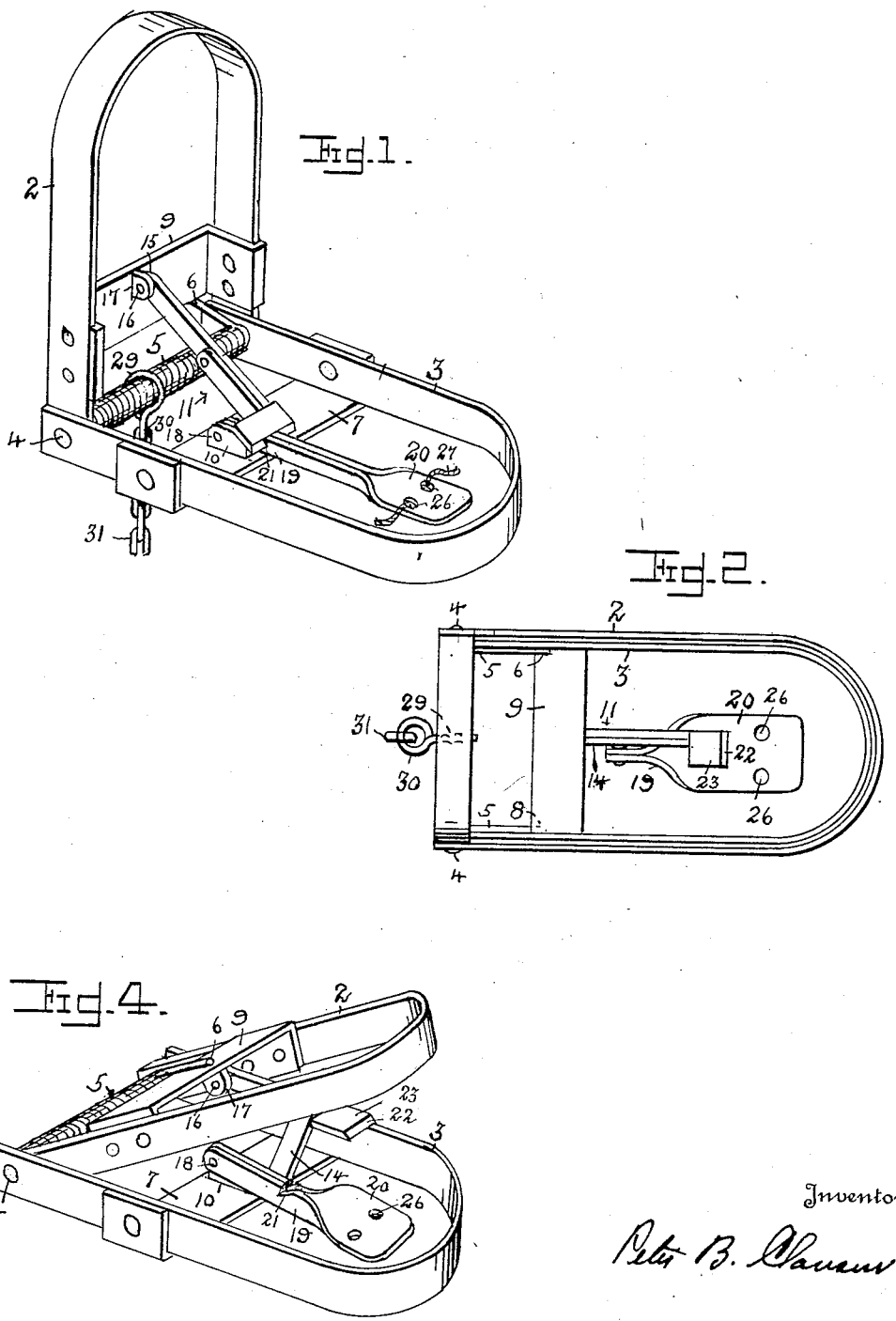

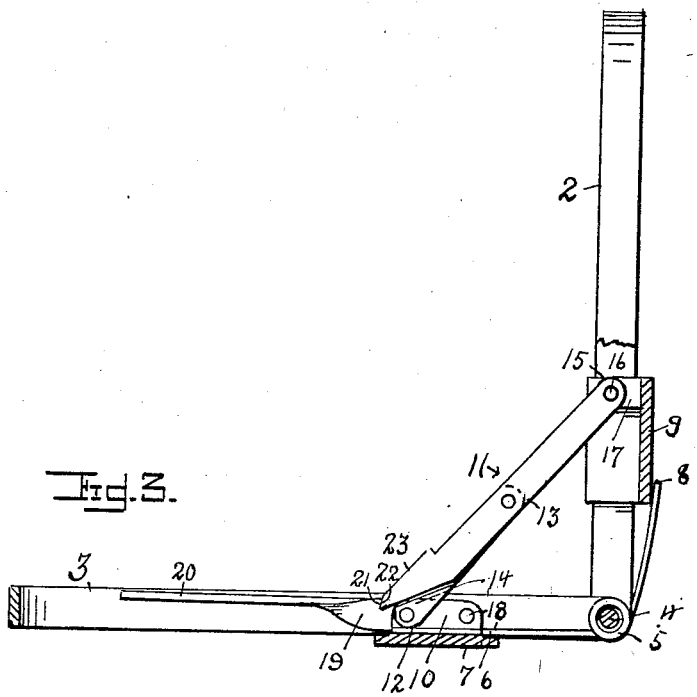

Patented Mar. 22, 1932

1,850,534

UNITED STATES PATENT OFFICE

PETER B. CLAUSEN, OF NEW LISBON, WISCONSIN

MUSKRAT TRAP

Application filed September 11, 1929. Serial No. 391,763.

This invention relates to improvements in steel traps, and has for its object to provide a self-setting steel trap.

Another object of the invention is to provide a trap of this nature so formed that it may be used under water for catching muskrats and the like, or set on the ground or upon tree stumps, poles, etc.

A further object of the invention is to provide a steel trap very simple and inexpensive of construction, and very sensitive and effective in operation.

Another object of the invention is to provide in a steel trap a spear for striking the animal being trapped whereby it will be killed instantaneously.

With the above and such other objects in view as may hereinafter more fully appear, I have invented the device shown in the accompanying drawings, in which:

Figure 1 is a perspective view of my trap, shown set;

Figure 2 is a plan view of the trap shown sprung;

Figure 3 is a side elevational view of the trap shown partly broken away and in reverse position, illustrating the manner of setting the trap;

Figure 4 is a view similar to Figure 1, partly broken away and showing the trap in the act of being sprung;

Figure 5 is an edge view of Figure 1, the side walls being broken away to illustrate the spearing action of the trap;

Like reference characters indicate like parts throughout the following specification, and in the several views in the drawings in which 1 indicates a steel trap, comprising a pair of U-shaped straps 2, and 3, adapted to nest, one within the other, and which are pivotally connected together at their free ends by means of a pivot pin 4. Around the pin 4, is coiled a spring 5, one end 6 of which seats upon the outer surface of the cross plate 7, of the U-member 3, and the other end 8 of which seats upon the outer surface of the cross plate 9, of the U-member 2, whereby the members 2 and 3 are held normally closed, one within the other. A bearing 10 is provided on the inner surface of the plate 7, to which a toggle 11 is pivoted at its end 12, which toggle is pivoted intermediately at 11' to one end 13 of a link 14, the other end 15 of which link is pivoted at 16 to a bearing 17 on the inner surface of the plate 9. Also pivoted to the bearing 10, at 18, rearwardly of the pivot 16, is a trigger arm 19 of a bait pan 20. The arm 19 being provided with a notch 21, into which the beveled or knife edge 22 of the spear end 23 of the toggle 11 is adapted to seat, the tension of said beveled edge against the inclined wall 24 of the notch 21, caused by the spring 5, being sufficient to hold the members 11 and 14 in alinement with one another to form a prop whereby the U-member 3 will be held normally raised against the tension of the spring 5. However, when any pressure is brought to bear upon the plate 20, either by the fore-feet or head of the animal being trapped, or by a hawk or other bird lighting thereon, the plate 20 and arm 19 thereof will be pressed down releasing the spear end 23 of the member 11, breaking the joint 13, and permitting the trap to be sprung by the tension of the spring 5.

As the joint 11' is broken the end 13 of the link 14 is raised to vertical position, lifting the arm 11 to substantially a horizontal position whereby the head 25 (shown dotted) of the animal being trapped, is speared causing instant death. The plate 20 is provided with apertures 26 to receive a cord 27 for tying bait onto the plate.

In setting the trap all that it is necessary to do is to draw the U-member 3 at right angles to the U-member 2, and reverse the trap which action will cause the arm 11 to fall to an inclined position and against the link 14, and at the same time the arm 19 of the pan 20 will fall down causing the notch 21 to engage said beveled edge 22 of the spear 26, thus setting the trap whereupon it may be again reversed to normal position and seated in any desired place.

The link 29 has one end 30 coiled around the spring 5, whereby the chain 31 may be fixed to the trap.

From the above description it will be seen that I have provided a very effective, simple and inexpensive steel trap which may be instantly set without danger to the operator and which is a humane trap in view of the fact that means is provided for spearing the animal caught to instant death.

Having described my invention that which I claim to be new and desire to procure by Letters Patent is:

1. In a steel trap a pair of jaws, means for holding the jaws normally closed, and a spear adapted to hold the jaws open.

2. In a steel trap a pair of jaws, means for holding the jaws normally closed, a spear adapted to hold the jaws open, and a trigger arm coacting with said spear to hold said jaws apart.

3. In a steel trap a pair of jaws, means for holding the jaws normally closed, a spear adapted to hold the jaws open, a trigger arm coacting with said spear to hold said jaws apart, and a bait plate carried by said arm.

4. In a steel trap, a pair of jaws, means for holding the jaws normally closed, a spear adapted to hold the jaws open, a trigger arm coacting with said spear to hold said jaws apart, and a bait plate carried by said arm, said jaws being formed of U-shaped straps.

5. The combination defined in claim 4, said U-shaped straps being pivotally connected at their free ends, said spear being inclined in position for holding the trap set.

6. In a steel trap a pair of jaws, means for holding the jaws normally closed, a spear adapted to hold the jaws open, a trigger arm coacting with said spear to hold said jaws apart, a bait plate carried by said arm, said jaws being formed of U-shaped straps, pivotally connected at their free ends, said spear being inclined in position for holding the trap set, and means for raising the spear to horizontal position for spearing action.

7. The device claimed in claim 6, said last means comprising a link pivoted to said spear member and to one of said jaw members.

8. In a steel trap means for spearing an animal caught therein.

9. In a steel trap means for spearing an animal caught therein, said means adapted to hold the trap set.

10. In a steel trap means for spearing an animal caught therein, said means adapted to hold the trap set, and a trigger having a notch for engaging said spear.

In testimony whereof I affix my signature.

PETER B. CLAUSEN.